US011892153B2

(12) United States Patent
Diotte

(10) Patent No.: US 11,892,153 B2
(45) **Date of Patent: *Feb. 6, 2024**

(54) ILLUMINABLE WALL SOCKET PLATES

(71) Applicant: SnapRays LLC, Vineyard, UT (US)

(72) Inventor: Daniel A. Diotte, Pickering (CA)

(73) Assignee: SnapRays, LLC, Vineyard, UT (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/121,571

(22) Filed: Dec. 14, 2020

(65) Prior Publication Data

US 2021/0098949 A1 Apr. 1, 2021

Related U.S. Application Data

(63) Continuation of application No. 16/667,667, filed on Oct. 29, 2019, now Pat. No. 10,886,674, which is a (Continued)

(51) Int. Cl.

| | |
|---|---|
| ***H01R 13/502*** | (2006.01) |
| ***F21V 33/00*** | (2006.01) |
| ***H01R 13/717*** | (2006.01) |
| ***H01R 24/78*** | (2011.01) |
| ***H01R 13/447*** | (2006.01) |

(Continued)

(52) U.S. Cl.

CPC ............ *F21V 33/00* (2013.01); *F21V 33/006* (2013.01); *H01R 13/447* (2013.01); *H01R 13/717* (2013.01); *H01R 13/7175* (2013.01); *H01R 13/748* (2013.01); *H01R 24/76* (2013.01); *H01R 24/78* (2013.01); *H01R 25/006* (2013.01); *F21V 23/0442* (2013.01); *F21Y 2115/10* (2016.08); *H01R 2103/00* (2013.01)

(58) Field of Classification Search

CPC .................................................... H01R 13/717
USPC .......................................................... 174/502
See application file for complete search history.

(56) References Cited

U.S. PATENT DOCUMENTS

| | | | |
|---|---|---|---|
| 1,938,309 | A | 12/1933 | Williams |
| 2,015,698 | A | 10/1935 | Tiffany |

(Continued)

FOREIGN PATENT DOCUMENTS

| | | |
|---|---|---|
| CA | 2732657 | 2/2011 |
| CN | 201311835 | 9/2009 |

(Continued)

OTHER PUBLICATIONS

Permaglo Night Light, www.costco.ca, accessed Mar. 21, 2017, pp. 1-4.

(Continued)

*Primary Examiner* — Stanley Tso
(74) *Attorney, Agent, or Firm* — Young Basile Hanlon & MacFarlane, P.C.

(57) ABSTRACT

The invention relates generally to an illuminable wall socket plate for replacing existing wall socket plates in one simple installation step. The illuminable wall socket plate obtains electric current from a socket to power a light by connecting metal tabs on the back side of the illuminable wall socket plate to socket terminals, and transferring electric current from the socket terminals to a light in the wall socket plate through conductive material, in accordance with the invention described herein.

20 Claims, 7 Drawing Sheets

Related U.S. Application Data continuation of application No. 15/695,002, filed on Sep. 4, 2017, now Pat. No. 10,468,834, which is a continuation-in-part of application No. 15/281,191, filed on Sep. 30, 2016, now Pat. No. 9,755,374, and a continuation-in-part of application No. 15/280,491, filed on Sep. 29, 2016, now Pat. No. 9,774,154, said application No. 15/281,191 is a continuation-in-part of application No. 13/821,366, filed on Apr. 5, 2013, now Pat. No. 9,482,426, said application No. 15/280, 491 is a continuation-in-part of application No. 13/821,366, filed as application No. PCT/US2011/050524 on Sep. 6, 2011, now Pat. No. 9,482,426.

(60) Provisional application No. 61/380,561, filed on Sep. 7, 2010.

(51) Int. Cl.

| | |
|---|---|
| ***H01R 13/74*** | (2006.01) |
| ***H01R 25/00*** | (2006.01) |
| ***H01R 24/76*** | (2011.01) |
| *F21V 23/04* | (2006.01) |
| *H01R 103/00* | (2006.01) |
| *F21Y 115/10* | (2016.01) |

(56) References Cited

U.S. PATENT DOCUMENTS 2,045,199 A 6/1936 Petersen
2,193,740 A 9/1938 Reed
2,134,695 A 11/1938 Bigman
2,227,549 A 1/1941 McNeill
D141,030 S 4/1945 Wheeler, Jr.
2,385,620 A 9/1945 Fleckenstein
2,428,167 A 9/1947 Linton
2,515,820 A 7/1950 Clark
2,575,820 A 11/1951 Linton
2,580,056 A 12/1951 Wheeler, Jr.
2,749,381 A 6/1956 Farish, Jr.
2,880,285 A 3/1959 Robison et al.
2,908,743 A 10/1959 Premoshis
2,934,590 A 4/1960 Thompson et al.
3,120,414 A 2/1964 Farish, Jr.
3,168,612 A 2/1965 Sorenson
3,307,030 A 2/1967 Francisco
D212,760 S 11/1968 Bordner
3,522,595 A 8/1970 White
3,588,489 A 6/1971 Gaines
3,680,237 A 8/1972 Finnerty, Sr.
3,739,226 A 6/1973 Seiter et al.
D230,274 S 2/1974 Pulos
3,859,454 A 1/1975 Mann
3,879,101 A 4/1975 McKissic
3,895,225 A 7/1975 Prior
4,000,405 A 12/1976 Horwinski
4,038,582 A 7/1977 Horwinski
4,117,258 A 9/1978 Shanker
4,255,780 A 3/1981 Sakellaris
4,282,591 A 8/1981 Andreuccetti
4,494,815 A 1/1985 Brzostek et al.
4,514,789 A 4/1985 Jester
4,534,486 A 8/1985 Eidson
4,546,419 A 10/1985 Johnson
4,611,264 A 9/1986 Bradley
4,616,285 A 10/1986 Sackett
4,617,613 A 10/1986 Rice
4,755,913 A 7/1988 Sleveland
4,774,641 A 9/1988 Rice
4,801,271 A 1/1989 Piper
4,952,755 A 8/1990 Engel et al.
4,970,349 A 11/1990 Jones
5,009,618 A * 4/1991 Black .................... H01R 43/24 439/856
5,016,398 A 5/1991 Fukunaga
5,096,439 A 3/1992 Arnett
D330,267 S 10/1992 Hendrix
5,153,816 A 10/1992 Griffin
5,186,682 A 2/1993 Iida
5,248,919 A 9/1993 Hanna
5,290,175 A 3/1994 Robinson
5,384,428 A 1/1995 Luu
5,406,439 A 4/1995 Crane et al.
5,473,517 A 12/1995 Blackman
5,477,010 A 12/1995 Buckshaw et al.
D366,339 S 1/1996 Waller
5,481,442 A 1/1996 Dickie et al.
5,485,356 A 1/1996 Nguyen
5,584,725 A 12/1996 Tseng
5,622,424 A 4/1997 Brady
5,660,459 A 8/1997 Appelberg
5,670,776 A 9/1997 Rothbaum
5,683,166 A 11/1997 Lutzker
D395,314 S 6/1998 Oikawa
D399,825 S 10/1998 Heung et al.
5,816,682 A 10/1998 Marischen
D401,566 S 11/1998 Gesmondi
5,833,350 A 11/1998 Moreland
D407,072 S 3/1999 Gaule
5,914,826 A 6/1999 Smallwood
5,998,735 A 12/1999 Patterson, Jr.
6,000,807 A 12/1999 Moreland
6,010,228 A 1/2000 Blackman
6,023,021 A 2/2000 Matthews et al.
D427,086 S 6/2000 Gaule
6,087,588 A 7/2000 Soules
6,089,893 A * 7/2000 Yu .................... H01R 13/7177 439/225
D429,829 S 8/2000 Doran
D443,500 S 6/2001 Luu
6,310,291 B1 10/2001 Clough
6,341,981 B1 1/2002 Gorman
D456,239 S 4/2002 Luu
6,390,647 B1 5/2002 Shaeffer
6,395,981 B1 5/2002 Ford et al.
6,423,900 B1 7/2002 Soules
D464,865 S 10/2002 Luu
6,457,843 B1 10/2002 Kester et al.
D473,528 S 4/2003 Wengrower
6,547,411 B1 4/2003 Dornbusch
6,608,253 B1 8/2003 Rintz
6,648,496 B1 11/2003 Elghoroury et al.
6,765,149 B1 7/2004 Ku
6,774,328 B2 8/2004 Adams et al.
6,805,469 B1 10/2004 Barton
6,808,283 B2 10/2004 Tsao
D500,743 S 1/2005 Savicki, Jr. et al.
6,867,370 B2 3/2005 Compagnone
6,883,927 B2 4/2005 Cunningham et al.
6,891,284 B2 5/2005 Tilley
6,895,177 B2 5/2005 He et al.
6,974,910 B2 12/2005 Rohmer
7,011,422 B2 3/2006 Robertson et al.
7,019,212 B1 3/2006 Esmailzadeh
7,036,948 B1 * 5/2006 Wyatt ................ H01R 13/6683 362/276
7,064,498 B2 6/2006 Dowling et al.
D542,627 S 5/2007 Rohmer et al.
7,247,793 B2 7/2007 Hinkson et al.
7,270,436 B2 9/2007 Jasper
7,273,983 B1 9/2007 Rintz
7,318,653 B2 1/2008 Chien
7,321,348 B2 1/2008 Cok et al.
D561,558 S 2/2008 Jackson
D561,559 S 2/2008 Krumpe
D567,633 S 4/2008 Anderson
7,360,912 B1 4/2008 Savicki, Jr.
D573,005 S 7/2008 Huang
D576,566 S 9/2008 Wu et al.
D577,985 S 10/2008 Kidman
7,480,123 B2 1/2009 Jones
7,506,990 B2 3/2009 Glazner
7,511,231 B2 3/2009 Drane et al.

(56) References Cited

U.S. PATENT DOCUMENTS

| | | | | |
|---|---|---|---|---|
| 7,547,131 | B2 | 6/2009 | Faunce | |
| 7,549,785 | B2 | 6/2009 | Faunce | |
| 7,576,285 | B1 | 8/2009 | Savicki, Jr. | |
| D603,984 | S | 11/2009 | Richter | |
| D606,029 | S | 12/2009 | Chou | |
| 7,674,976 | B2 | 3/2010 | Eastin | |
| 7,745,750 | B2 | 6/2010 | Hewson et al. | |
| 7,821,160 | B1 | 10/2010 | Roosli et al. | |
| 7,850,322 | B2 | 12/2010 | Glazner et al. | |
| 7,918,667 | B1 | 4/2011 | Shim | |
| 7,946,871 | B1 | 5/2011 | Yu et al. | |
| 8,003,886 | B1 | 8/2011 | Rintz | |
| 8,063,303 | B1 | 11/2011 | McBain | |
| D650,112 | S | 12/2011 | Bryant | |
| 8,148,637 | B2 | 4/2012 | Davidson | |
| 8,158,885 | B2 | 4/2012 | Eastin | |
| 8,175,533 | B2 | 5/2012 | Schubert | |
| D666,471 | S | 9/2012 | Peckham | |
| 8,304,652 | B2 | 11/2012 | McBain | |
| 8,393,747 | B2 | 3/2013 | Kevelos et al. | |
| 8,467,734 | B2 | 6/2013 | Schubert | |
| 8,511,866 | B1 | 8/2013 | Mendez | |
| 8,558,710 | B1 | 10/2013 | Nitz | |
| 8,564,279 | B2 | 10/2013 | Johnson et al. | |
| 8,629,617 | B2 | 1/2014 | Richards et al. | |
| 8,638,085 | B2 | 1/2014 | Hilton et al. | |
| 8,668,347 | B2 | 3/2014 | Ebeling | |
| 8,697,991 | B2 | 4/2014 | Davidson | |
| 8,770,424 | B1 | 7/2014 | Shaw et al. | |
| 8,797,723 | B2 | 8/2014 | Hilton et al. | |
| D719,699 | S | 12/2014 | Bryant | |
| 8,912,442 | B2 | 12/2014 | Smith | |
| D721,043 | S | 1/2015 | Tonnesen | |
| 9,035,180 | B2 | 5/2015 | Smith et al. | |
| 9,035,181 | B2 | 5/2015 | Smith et al. | |
| 9,362,728 | B2 | 6/2016 | Smith et al. | |
| 9,464,795 | B2 | 10/2016 | Ebeling | |
| 9,482,426 | B2 * | 11/2016 | Diotte | H01R 13/7175 |
| 9,575,587 | B2 | 2/2017 | O'Keeffe | |
| 9,742,111 | B2 | 8/2017 | Smith et al. | |
| 9,755,374 | B2 | 9/2017 | St. Laurent et al. | |
| 9,768,562 | B2 | 9/2017 | Smith et al. | |
| 9,774,154 | B2 * | 9/2017 | St. Laurent | H01R 24/76 |
| 9,807,829 | B2 | 10/2017 | Jensen | |
| 9,832,841 | B2 | 11/2017 | Knight et al. | |
| 9,871,324 | B2 | 1/2018 | Smith et al. | |
| 9,882,318 | B2 | 1/2018 | Smith et al. | |
| 9,882,361 | B2 | 1/2018 | Smith et al. | |
| 9,899,814 | B2 | 2/2018 | Smith et al. | |
| 9,917,430 | B2 | 3/2018 | Smith et al. | |
| D819,426 | S | 6/2018 | Smith et al. | |
| 9,997,860 | B1 | 6/2018 | Hernandez, Jr. | |
| 10,109,945 | B2 | 10/2018 | Smith et al. | |
| 10,136,534 | B2 | 11/2018 | Ebeling | |
| 10,468,834 | B2 * | 11/2019 | Diotte | H01R 24/78 |
| 10,506,316 | B2 | 12/2019 | Ebeling et al. | |
| 10,586,666 | B2 | 3/2020 | Bailey et al. | |
| 10,630,031 | B1 | 4/2020 | Baldwin | |
| 10,667,347 | B2 | 5/2020 | Fadell et al. | |
| 10,720,727 | B1 | 7/2020 | Shotey et al. | |
| 10,886,674 | B2 * | 1/2021 | Diotte | H01R 13/7175 |
| 2001/0046130 | A1 | 11/2001 | Cunningham et al. | |
| 2002/0131262 | A1 | 9/2002 | Amburgey | |
| 2003/0013503 | A1 | 1/2003 | Menard et al. | |
| 2003/0124022 | A1 | 7/2003 | Georges et al. | |
| 2004/0247300 | A1 | 12/2004 | He et al. | |
| 2005/0264383 | A1 | 12/2005 | Zhang | |
| 2006/0065510 | A1 | 3/2006 | Kiko et al. | |
| 2006/0072302 | A1 | 4/2006 | Chien | |
| 2006/0077684 | A1 | 4/2006 | Yuen | |
| 2006/0161270 | A1 | 7/2006 | Luskin et al. | |
| 2006/0170380 | A1 | 8/2006 | Evans | |
| 2006/0262462 | A1 | 11/2006 | Barton | |
| 2007/0120978 | A1 | 5/2007 | Jones | |
| 2007/0206375 | A1 | 9/2007 | Piepgras et al. | |
| 2008/0073117 | A1 | 3/2008 | Misener | |
| 2008/0233780 | A1 | 9/2008 | Waters et al. | |
| 2008/0266121 | A1 | 10/2008 | Ellul | |
| 2009/0153438 | A1 | 6/2009 | Miller et al. | |
| 2009/0225480 | A1 | 9/2009 | Baxter | |
| 2009/0284385 | A1 | 11/2009 | Tang et al. | |
| 2009/0322159 | A1 | 12/2009 | Dubose et al. | |
| 2010/0033950 | A1 | 2/2010 | Farrell | |
| 2011/0056720 | A1 | 3/2011 | Davidson | |
| 2011/0082599 | A1 | 4/2011 | Shinde et al. | |
| 2011/0210833 | A1 | 9/2011 | McNeely et al. | |
| 2011/0228552 | A1 | 9/2011 | Kevelos et al. | |
| 2012/0008307 | A1 | 1/2012 | Delany | |
| 2012/0068612 | A1 | 3/2012 | Ebeling | |
| 2012/0156937 | A1 | 6/2012 | Almouli | |
| 2012/0182172 | A1 | 7/2012 | Sorensen | |
| 2012/0215470 | A1 | 8/2012 | Maguire | |
| 2012/0316808 | A1 | 12/2012 | Frader-Thompson et al. | |
| 2013/0043978 | A1 | 2/2013 | Brooks | |
| 2013/0063848 | A1 | 3/2013 | Thorpe et al. | |
| 2013/0076242 | A1 | 3/2013 | Moreland | |
| 2013/0221868 | A1 | 8/2013 | Diotte | |
| 2013/0240470 | A1 | 9/2013 | Huang | |
| 2015/0371534 | A1 | 12/2015 | Dimberg et al. | |
| 2017/0018890 | A1 | 1/2017 | St. Laurent | |
| 2017/0018897 | A1 | 1/2017 | St. Laurent | |
| 2017/0214188 | A1 | 7/2017 | Smith | |
| 2018/0048099 | A1 | 2/2018 | Diotte | |
| 2019/0090372 | A1 | 3/2019 | Ebeling | |
| 2020/0154186 | A1 | 5/2020 | Ebeling et al. | |

FOREIGN PATENT DOCUMENTS

| | | |
|---|---|---|
| DE | 202006006354 | 10/2007 |
| EP | 2211210 | 7/2010 |
| KR | 1019930025223 | 6/1995 |
| KR | 1019950015932 | 6/1995 |
| KR | 1020090098056 | 9/2009 |
| KR | 1020080047328 | 11/2009 |
| KR | 1020090121424 | 11/2009 |
| KR | 100955064 | 4/2010 |
| WO | 2007122141 | 11/2007 |
| WO | 2012006812 | 1/2012 |
| WO | 2012033746 | 3/2012 |
| WO | 2013019394 | 2/2013 |
| WO | 2014070863 | 5/2014 |

OTHER PUBLICATIONS

PermaGLO Safety Lighting Products, www.permaglo.com, accessed Mar. 21, 2017, 1 page.
Request for Ex Parte Reexamination for U.S. Pat. No. 9,035,180, May 19, 2015.
TekSkCo Technical Systems Company—Plug into The Future, at least as early as Jul. 16, 2009.
Request for Ex Parte Reexamination for U.S. Pat. No. 8,912,442, May 19, 2015.
Ontel answer and Affirmative Defenses to Plaintiff's Second Amended Complaint, U.S. District Court filing, Jun. 5, 2017.
Ontel Defendants LPR 2.2(b) Initial Disclosures, U.S. District Court filing, Jul. 14, 2017.
Ontel Defendants LPR 2.4 Preliminary Non-Infringement and Invalidity Contentions, Aug. 8, 2017.
Ontel Defendants Memorandum in Opposition to Plaintiff's Motion for Leave to File a Second Amended Complaint, U.S. District Court filing, Apr. 11, 2017.
U.S. Appl. No. 61/380,561 made publicly accessible with U.S. Patent Application Publication No. 2013/0221868, filed Aug. 29, 2013, pp. 1-19.
Office Action dated Jan. 26, 2018 for U.S. Re-exam U.S. Appl. No. 90/014,022.
Office Action dated Feb. 23, 2018 for U.S. Re-exam U.S. Appl. No. 90/014,022.
Office Action dated Sep. 20, 2018 for U.S. Appl. No. 15/920,047.
Initial Expert Report of Michael Thuma.

(56) References Cited

OTHER PUBLICATIONS

UL warns of night light with unauthorized UL Mark, Product Safety Alert, Jul. 13, 2009, pp. 1-2, Electrical Safety Authority.
Plate Pals Wallplate Thermometers, http://www.platepals.com/home.html. Last visited Apr. 12, 2017. ,2006.
Respondent Alltrade Tools LLC's Notice of Prior Art.
Respondent Alltrade Tools LLC's Second Supplemental Invalidity Contentions.
Respondent Alltrade Tools LLC's Supplemental Invalidity Contentions.
Respondent Enstant Technology Co., Ltd,'s Response to Compainant Snaprays, LLC's Invalidity Contentions Interrogatories.
Respondent Ontel Products Corporation's Notice of Prior Art.
Respondent Enstant Technology Co., Ltd. and Vistek Technology Co., Lts.'s Notice of Prior Art.
Written Opinion of the International Searching Authority for PCT/US2011/050524, pp. 1-3, dated Mar. 26, 2012.
Translation of KR 10-2008-0047328.
Translation of KR 10-2009-0098056.

* cited by examiner

ILLUMINABLE WALL SOCKET PLATES

RELATED APPLICATIONS

This application is a continuation of U.S. patent application Ser. No. 16/667,667 filed Oct. 29, 2019, which is a continuation of U.S. patent application Ser. No. 15/695,002 filed Sep. 4, 2017 (now U.S. Pat. No. 10,468,834), which: (1) is a continuation-in-part of U.S. patent application Ser. No. 15/280,491 filed Sep. 29, 2016 (now U.S. Pat. No. 9,774,154), which is a continuation-in-part of U.S. patent application Ser. No. 13/821,366 filed Apr. 5, 2013 (now U.S. Pat. No. 9,482,426), which is a national stage application submitted under 35 U.S.C. 371 based on International Application No. PCT/US2011/050524 filed Sep. 6, 2011, which claims the benefit of U.S. Provisional Patent Application Ser. No. 61/380,561 filed Sep. 7, 2010; and (2) is a continuation-in-part of U.S. patent application Ser. No. 15/281,191 filed Sep. 30, 2016 (now U.S. Pat. No. 9,755,374), which is a continuation-in-part of U.S. patent application Ser. No. 13/821,366 filed Apr. 5, 2013 (now U.S. Pat. No. 9,482,426), which is a national stage application submitted under 35 U.S.C. 371 based on International Application No. PCT/US2011/050524 filed Sep. 6, 2011, which claims the benefit of U.S. Provisional Patent Application Ser. No. 61/380,561 filed Sep. 7, 2010.

U.S. patent application Ser. No. 16/667,667, U.S. patent application Ser. No. 15/695,002, U.S. patent application Ser. No. 15/280,491, U.S. patent application Ser. No. 15/281,191, U.S. patent application Ser. No. 13/821,366, International Application No. PCT/US2011/050524, and U.S. Provisional Patent Application Ser. No. 61/380,561 are each hereby incorporated by reference.

BACKGROUND

Field of the Invention

The invention relates generally to an easy to install illuminable wall socket plate that obtains power from wall socket terminals, to light one or more lights embedded in the illuminable wall socket plate.

Background Art

The invention relates generally to an illuminable wall socket plate that can be installed easily to replace existing wall socket plates. The wall socket plate in accordance with the present invention has metal tabs and conductive material on the back of the plate to supply electric current to a light in the plate. More particularly, the metal tabs conduct electric current from socket terminal screws for lighting a light in the illuminable wall socket plate.

Various wall socket plates have been devised and constructed with features that enhance or add to the standard wall socket plate. Examples of enhanced wall socket plates include U.S. Pat. No. 7,318,653 which covers a multiple function wall cover plate with a front cover and a bottom base, prongs to supply electricity from an existing receptacle, a light between the front cover and the back base and a fragrance refill means. The multiple function wall cover plate uses one prong set to plug into an existing wall socket receptacle to power one or more new receptacles on the multiple function wall cover plate and to power the added features of the multiple function wall cover plate. Unlike the present invention, the '653 patent requires the use of existing receptacles to power the multiple function wall cover plate and requires a bulky system to provide new receptacles in order to maintain the original number of receptacles in the wall socket.

In a search for light emitting diode nightlights the following patents were reviewed: U.S. Pat. Nos. 5,816,682, and 7,036,948. U.S. Pat. No. 5,816,682 claims an electric faceplate and a method for attaching a nightlight adjacent to an electrical receptacle. The application shows that electrical wires from the existing electrical receptacle are used to power the adjacent nightlight, unlike the invention described herein. The nightlight in the '682 patent further is adjacent to the electrical receptacle, designed to fit onto the side of a faceplate, and is powered by electrical wires in the faceplate. U.S. Pat. No. 7,036,948 describes a light embedded in the electric receptacle that is receptive to the lighting in the room and can increase or decrease it's power based on the voltage in the room. The '948 patent described standard copper wire means to provide current to the lighting system embedded in the light receptacle cover, unlike the invention disclosed herein.

Other U.S. references found include U.S. Pat. Nos. 2,015,698; 3,307,030; 3,895,225; 4,774,641; 5,683,166; 6,089,893; 6,709,126; 6,648,496. None of the prior references discovered describe or show the ability to power an illuminable wall socket plate without blocking one socket receptacle or using the prongs of one socket receptacle to power a light. The ability to use electric current in wall socket terminals to power a light in an illuminable wall socket plate is a unique discovery in accordance with the present invention.

SUMMARY

An illuminable wall socket plate in accordance with the present invention provides an easy method for replacing standard wall socket plates. The illuminable wall socket plate utilizes a simple technique where metal tabs are used to conduct power in the existing wall socket terminal screws to convert and provide electric current to a light in a wall socket plate. In accordance with at least one of the methods and devices described herein, the illuminable wall socket plate remains powered once the plate is screwed into the existing wall socket.

There are many uses for an illuminable wall socket plate that can easily be screwed into a wall socket. Those uses include, but are not limited to, a nightlight for a child's room, a continuous dim light source for a room or a hallway, a decorative light for an outdoor or indoor socket, and any other desired use that a consumer may choose.

BRIEF DESCRIPTION OF DRAWINGS

These objectives and features of the invention shall now be described in relationship to the following figures, which are an integral part of the specifications and are incorporated herein.

DETAILED DESCRIPTION OF THE PREFERRED EMBODIMENT

In the following detailed description of the invention, reference is made to the accompanying drawings, which form a part hereof, and which is shown by way of illustration of specific exemplary embodiments in which the invention may be practiced. These embodiments are described in sufficient detail to enable those skilled in the art to practice the invention, but other embodiments may be utilized and logical and other changes may be made without departing from the scope of the present invention. The following detailed description is, therefore, not to be taken in a limiting sense.

In the following description, numerous specific details are set forth to provide a thorough understanding of the invention. However, it is understood that the invention may be practiced without these specific details. In other instances, well-known steps, tools and techniques and socket types known to one of ordinary skill in the art have not been shown in detail in order not to obscure the invention. Referring to the figures, it is possible to see the various major elements constituting the methods and systems of the present invention.

Figure 1:
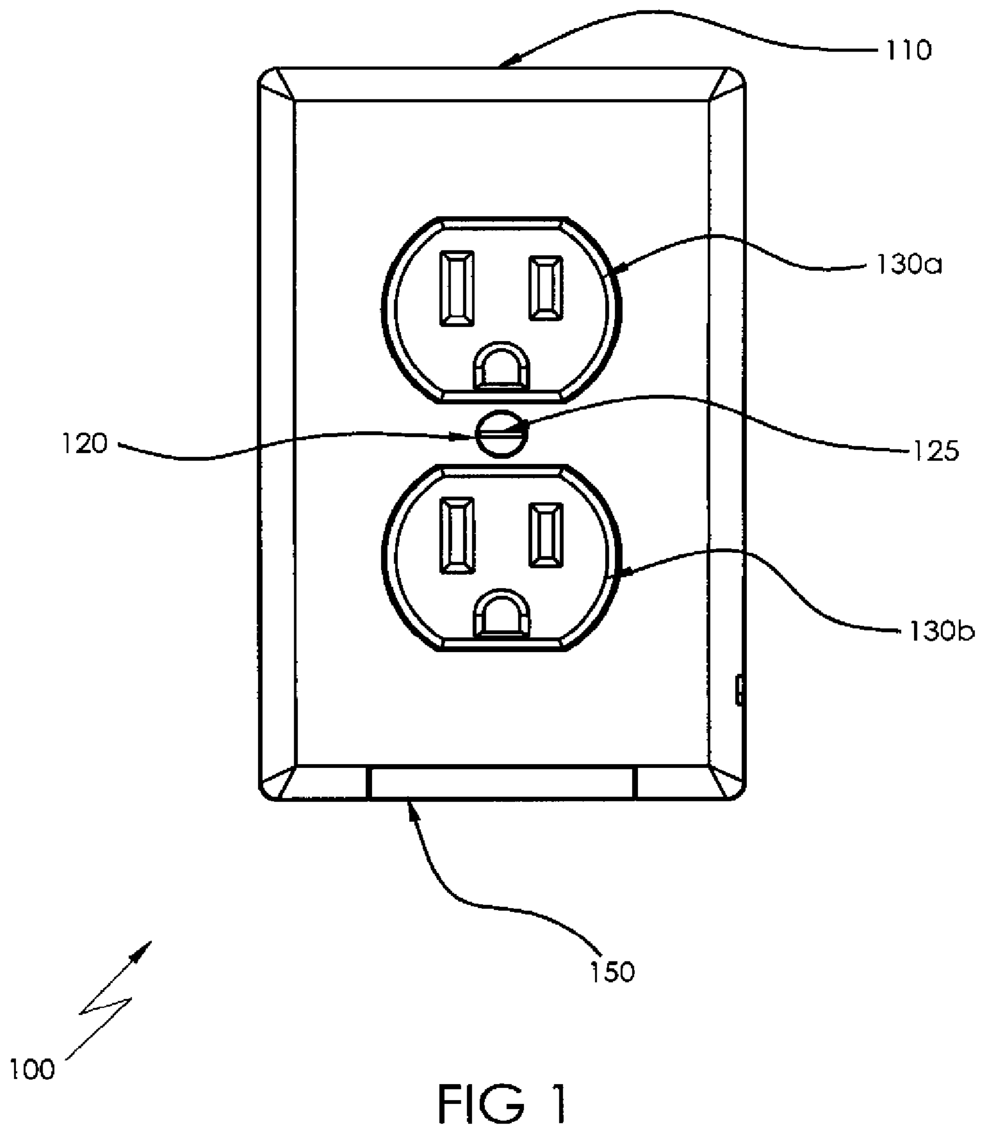
FIG. 1 is a front view of the illuminable wall socket plate in accordance with an embodiment of the present invention.

As shown in the drawings wherein like numerals represent like parts throughout the several views, there is generally disclosed in FIG. 1 a front view of an illuminable wall socket plate 100, showing a plate 110, a first receptacle 130*a*, a second receptacle 130*b*, and a hole for a screw 120 for attaching the illuminable wall socket plate 100 to a wall with a screw 125. At the bottom of the plate 110 a light 150 is shown, as part of the illuminable wall socket plate 100 in accordance with the first embodiment of the present invention. In accordance with the embodiment shown, the illuminable wall socket plate 100 can easily replace a standard socket plate by simply removing the socket plate and screwing in the illuminable wall socket plate 100. The light 150 may also be located anywhere on the illuminable wall socket plate 100 including the top, bottom, side or middle of the illuminable wall socket plate 100, as may be desired.

Figure 2:
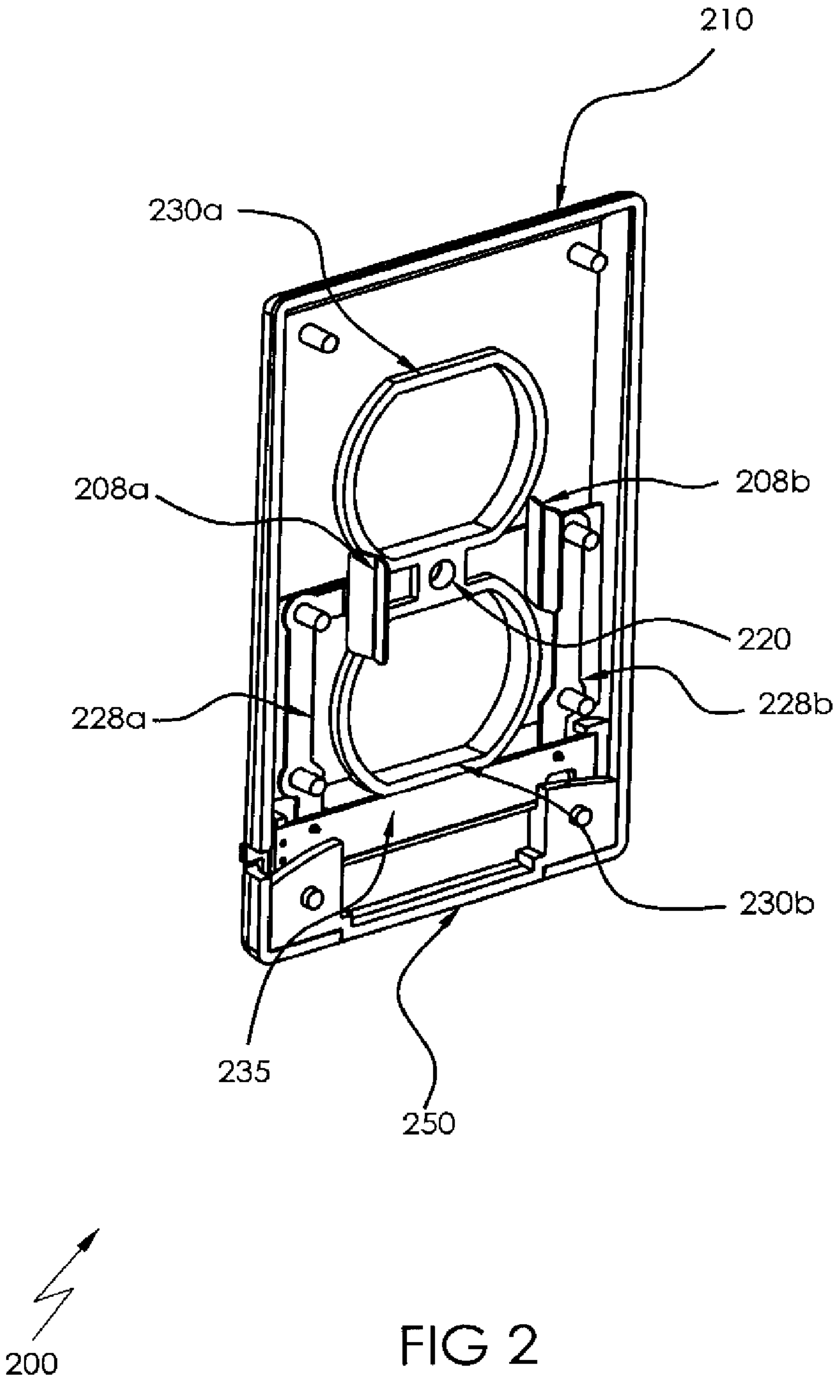
FIG. 2 is a back perspective view of the illuminable wall socket plate in accordance with an embodiment of the present invention.

FIG. 2 depicts a back perspective view of the illuminable wall socket plate 200 in accordance with the first embodiment of the present invention. The back perspective view shows metal tabs 208*a* and 208*b* for attaching the illuminable wall socket plate around existing terminal screws in the wall socket (shown in FIG. 3) for transporting electric current from the terminal screws through the circuit connectors 228*a* and 228*b* and a circuit board 235 to power a light 250. The metal tabs 208*a* and 208*b* are designed in this embodiment to easily clip around the terminal screws in the wall socket, for easy and safe installation by a user. A hole for a screw 220 is shown in FIG. 2 centered in the plate 210 for attaching the plate 210 to the wall socket with a screw. A first plate receptacle 230*a* and a second plate receptacle 230*b* are provided so that a user can use the original receptacles in the wall socket without covering or using the wall socket receptacles to power the light 250 in the plate 210 or having to add new receptacles on the illuminable wall socket plate 200 to power the light 250.

As a further description of the first embodiment in accordance with the present invention, the metal tabs 208*a* and 208*b* are provided to obtain power surrounding the screws in the wall socket, as further shown in FIG. 2. The diameter of the illuminable wall socket plate with the metal tabs 208*a* and 208*b* is preferably between 0.01 and 0.07 mm for ease of use by a consumer to replace an already existing wall plate. In accordance with the back perspective view of the embodiment shown in FIG. 2, the light may be any kind of light suitable for a wall socket plate, including but not limited too, E.L elements, light emitting diodes, incandescent bulbs, neon lights, florescent tubes, black lights, gas filled bulbs, halogen lights, or any other light capable of fitting into or connecting to the illuminable wall socket plate 200. In addition, the light may be located anywhere on the back or front of the illuminable wall socket plate 200 in accordance with the first embodiment shown.

Figure 3:
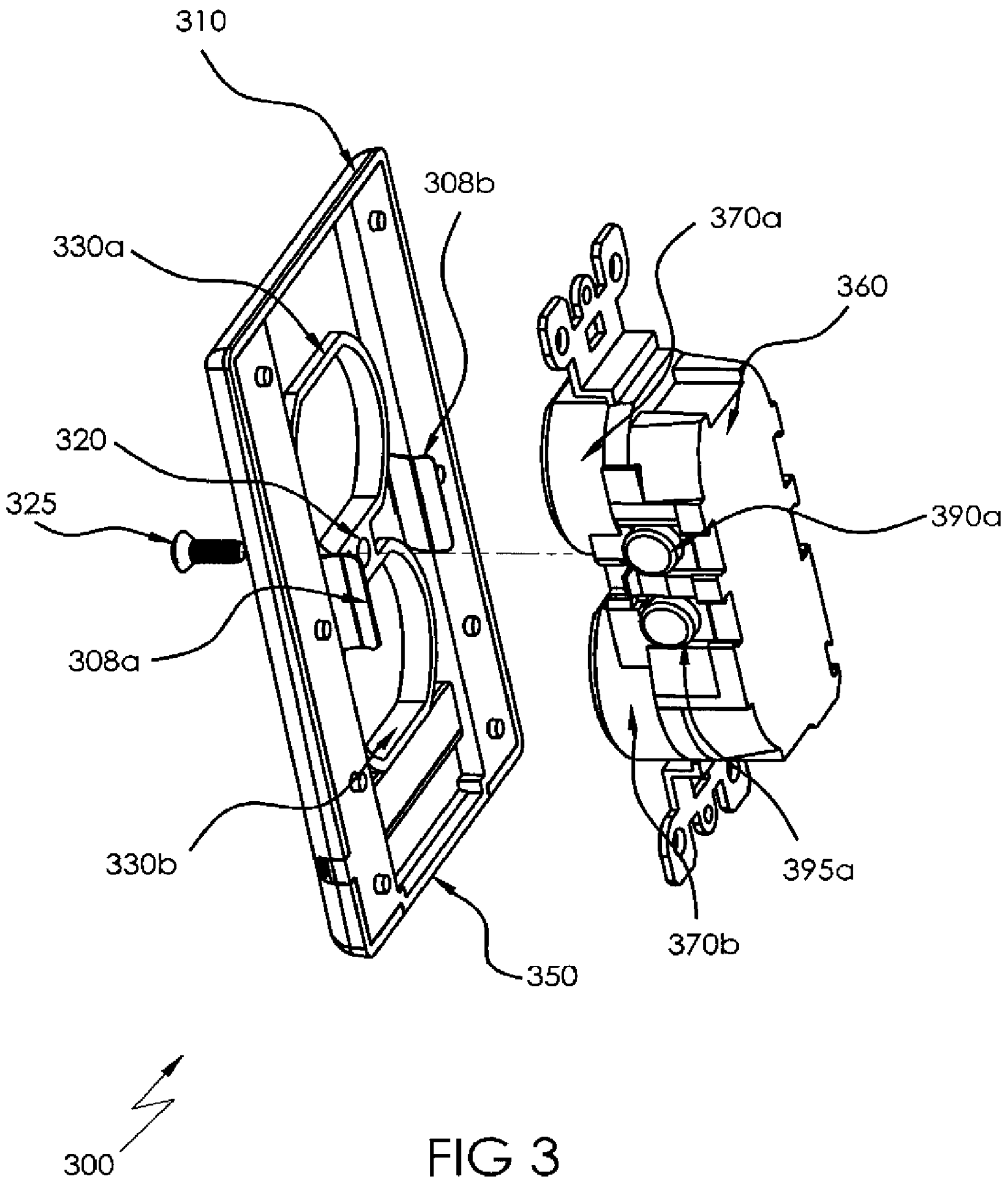
FIG. 3 is a side perspective view of the illuminable wall socket plate and a wall socket showing the metal tabs and the socket terminal screws for supplying electric current to the light in the illuminable wall socket plate in accordance with an embodiment of the present invention.

FIG. 3 shows a side perspective view of the illuminable wall socket plate 300 being attached to an existing wall socket 360 in accordance with an embodiment of the present invention. In accordance with the embodiment shown, the metal tabs 308*a* and 308*b* are formed to surround the terminal screws 390*a* and 395*a*, with a corresponding set of terminal screws not shown on the other side of the wall socket 360. A first plate receptacle 330*a* and a second plate receptacle 330*b* are fitted to surround a first wall receptacle 370*a* and a second wall receptacle 370*b* respectively, when the plate 310 is screwed into the wall socket 360. A hole for a screw 320 in the plate 300 is further provided to align the screw 325 in the wall socket 360 to affix the illuminable wall socket plate 300 to the wall socket 360. FIG. 3 also shows a light 350 for illuminating the illuminable wall socket plate 300.

In accordance with the embodiment shown in FIG. 3, three simple steps are provided for affixing the illuminable wall socket plate 300 to the wall socket 360. In a first step, a user unscrews an existing socket plate from a wall socket 360. In a second step, a user places the metal tabs 308*a* and 308*b* to surround terminal screws 390*a*, 395*a* and their corresponding terminal screws on the other side of the wall socket 360, and in a final step a user places a screw 325 through a hole for a screw 320 in the wall socket 360 to attach the illuminable wall socket plate 300 to the wall socket 360. In accordance with the steps described in this embodiment, the light 350 is automatically lit when the illuminable wall socket plate is screwed into place, where electric current is carried from the metal tabs 308*a* and 308*b* to the light 350 through the circuit connectors (not shown), a process which is described in more detail in FIG. 5. While the present embodiment does not show an on/off switch to the illuminable wall socket plate 300, an on/off switch can easily be added to turn off or to dim the light 350 in accordance with a user's desired lighting activity.

Figure 4A:
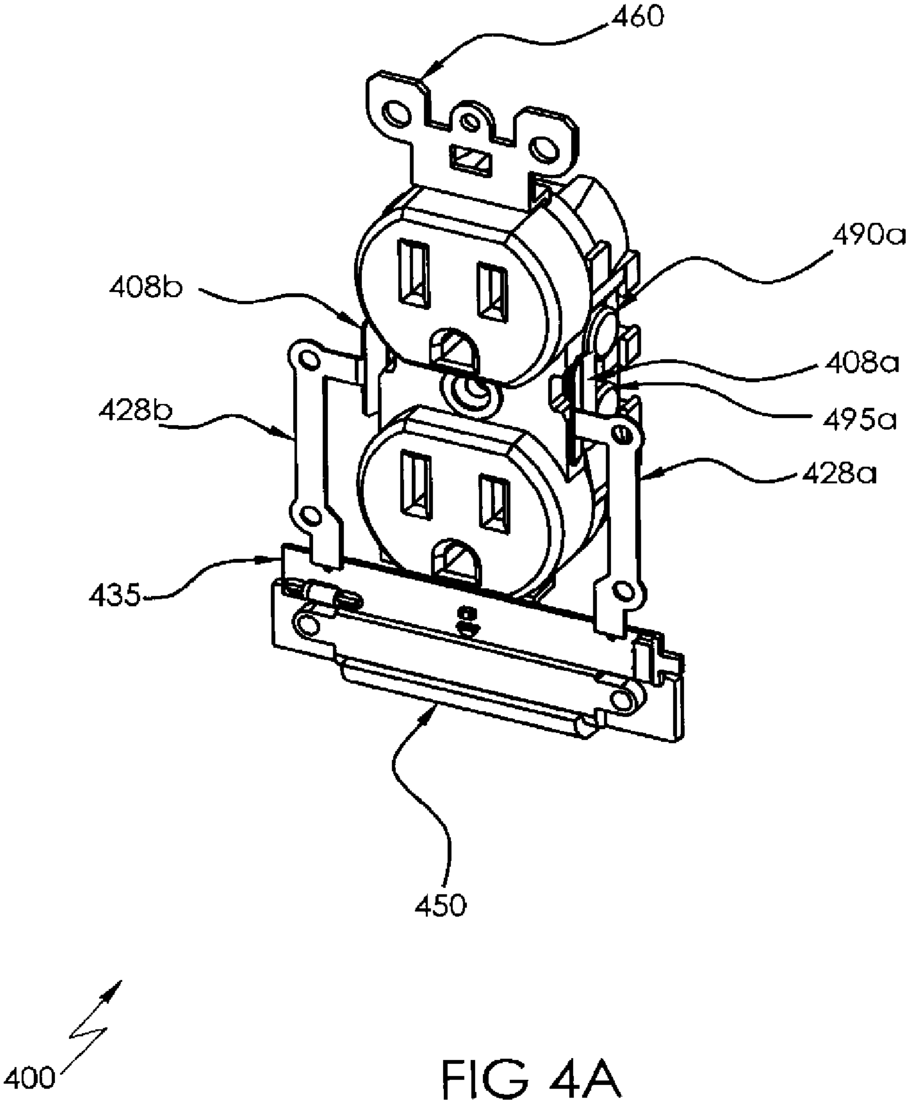
FIG. 4A is a front perspective view of the illuminable wall socket plate with the plate not shown to show the connection of the metal tabs to the socket terminal screws.

FIG. 4A shows a perspective view of the illuminable wall socket plate 400 attached to the wall socket 460 with the plate removed to show the circuit connectors 428*a* and 428*b* in accordance with an embodiment of the present invention. In accordance with the embodiment shown, the metal tabs 408*a* and 408*b* are shown surrounding the terminal socket screws 490*a* and 495*a* (and the corresponding screws for the metal tab 408*b*, not shown), with circuit connectors 428*a* and 428*b* provided to carry electric current obtained through the metal tabs 408*a* and 408*b* to a circuit board 435 for lighting a light 450. In this embodiment, the circuit board 435 is formed with a capacitor and resistors to lower the voltage from alternating current to direct current power, or to convert form high alternating current power of about 240 volts to 120 volts to low alternating current power, in a range of about 1 to 5 volts for powering a light emitting diode light. In other embodiments rectifiers are used convert high power current to low power current to illuminate a light in the illuminable wall socket plate 400.

Figure 4B:
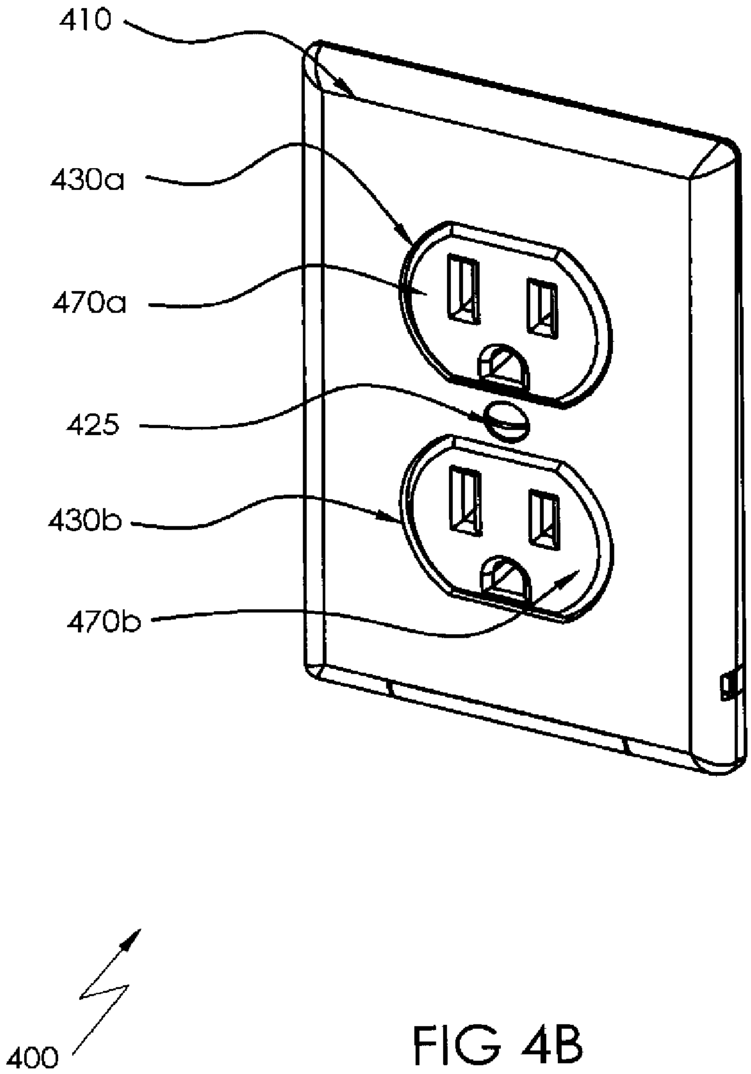
FIG. 4B is a front perspective view of the illuminable wall socket plate attached to a wall socket in accordance with an embodiment of the present invention.

FIG. 4B shows the illuminable wall socket plate 400 as shown in FIG. 4A with the plate 410 intact, showing the illuminable wall socket plate 400 installed. In this embodiment a first plate receptacle 430*a* surrounding a first wall receptacle 470*a* and a second plate receptacle 430*b* surrounding a second wall receptacle 370*b* are shown both remaining open for use when the illuminable wall socket plate 400 is installed, while the light 450 is lit from the socket terminal screws as described and shown in FIG. 4A. A screw 425 is also shown being used to affix the illuminable wall socket plate 400 to the wall socket.

Figure 5:
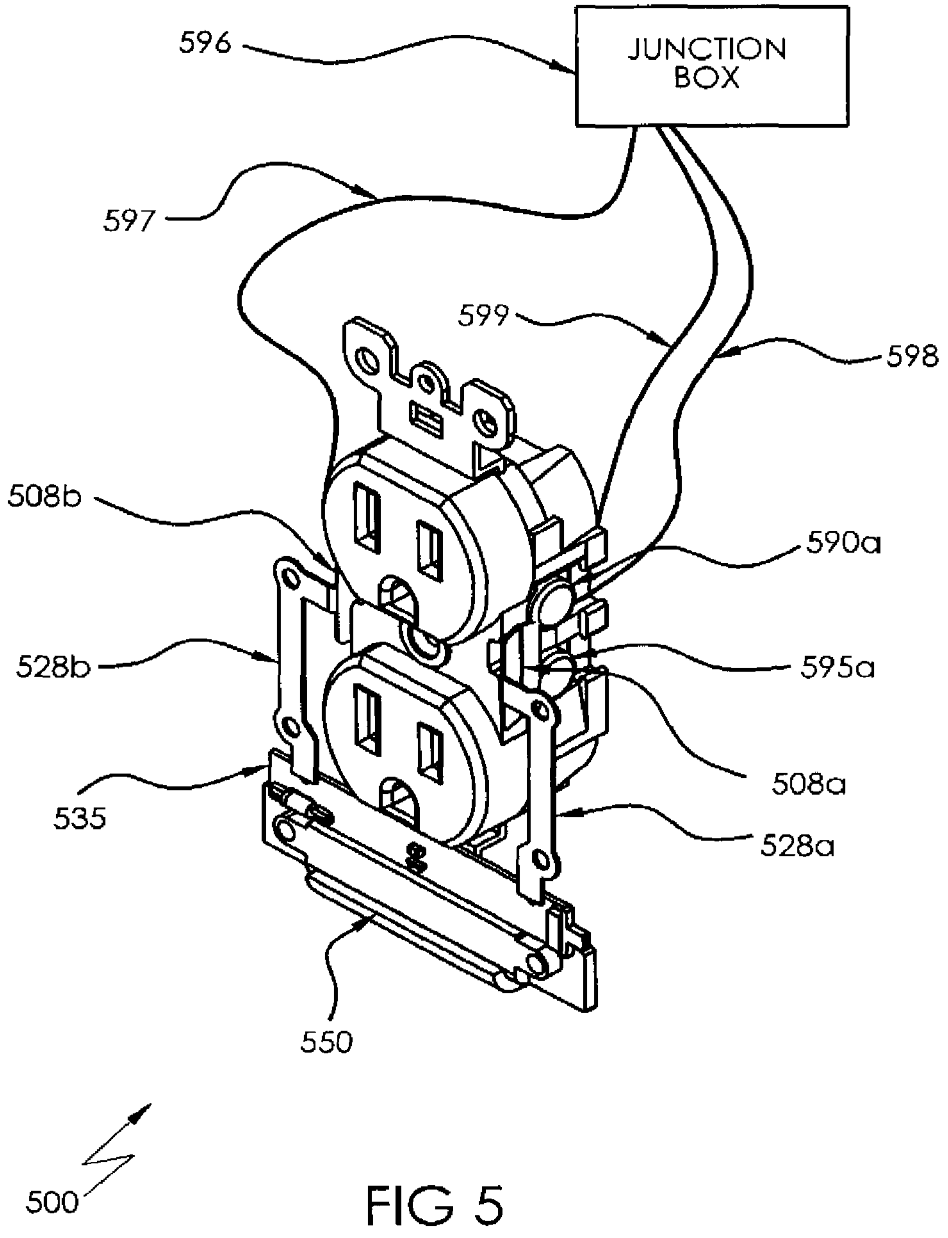
FIG. 5 is a front perspective view of a socket and the socket wires connecting to an illuminable wall socket plate in accordance with an embodiment of the present invention.

FIG. 5 shows a front perspective view of a more detailed analysis of the unique method used in accordance with an embodiment of the present invention to provide power to the light 550 in an illuminable wall socket plate 500 in accordance with the present invention. A socket is shown with the illuminable wall socket plate 500 attached, where the metal tabs 508*a* and 508*b* are surrounding the socket terminal screws 590*a* and 595*a* (and the corresponding socket terminal screws not shown for metal tab 508*b*) to obtain electric current from the socket terminal screws. In this embodiment circuit connectors 528*a* and 528*b* are provided for transferring electric current from the metal tabs 508*a* and 508*b* to the circuit board 535 and to a light 550. In accordance with this embodiment, a capacitor and resistor are provided to lower 120 volt alternating current power to 3 volt power to light a light emitting diode light. A junction box 596 is shown in the wall socket with green safety wires 596, return white wires 597 and hot black wires 598 extending from the junction box 596 to the wall socket 500. In accordance with the electric socket shown, the green wires 596 are safety wires preventing electric shock by initiating shortages at a fuse box. In a typical socket in the United States, along with several other countries implementing type A and B electrical outlets, there are approximately 120 volts of electricity between the black wires 598 and the white wires 597. In accordance with the embodiment of the present invention shown, metal tabs transfer electric current from the socket terminal screws 590*a* and 595*a*, and the corresponding socket terminal screws not shown, through the metal tabs 508*a* and 508*b*, to the circuit connectors 528*a* and 528*b* and converts the high alternating current power to low alternating current power in the circuit board 535, to light a light emitting diode light 550 in the illuminable wall socket plate 500 in accordance with the present invention.

There are many additional features and safety features that can be added to the illuminable wall socket plates described in accordance with the embodiments of the present invention shown. Those features include but are not limited too, the addition of rubber or other non-conductive gripping pieces to the illuminable wall socket plate 500 or to the metal tabs 508*a* and 508*b* for ease of installation by a user, shortage safeguards in the circuit board to prevent any possibility of shock to a user, providing an on/off switch for ease of use by a user, along with many other features that a user may desire for safety or aesthetic purposes. In yet other embodiments, sensors may be embedded in the illuminable wall socket plate so that a light turns on and off when a signal is given, such as when a user walks by the sensors. In yet other embodiments, fragrance features, decorations, colored lights and/or decorated lights that release patterns, removable lights or light decoration patterns, designs, characters or the like, air fresheners, sound recordings, such as music for a child's room, may be further desired aspects of the present invention as features to add to an illuminable wall socket plate 500 in accordance with the present invention. For instance, in one embodiment of the present invention an improved wall socket plate with a chamber containing a fragrance is further described, wherein the chamber containing the fragrance is connected to the one or more tabs in accordance with the present invention by a conductive material and wherein the chamber releases the liquid fragrance when the chamber is heated, thereby providing an air freshener to any room from a wall socket plate, without covering any of the existing wall socket receptacles.

Figure 6:
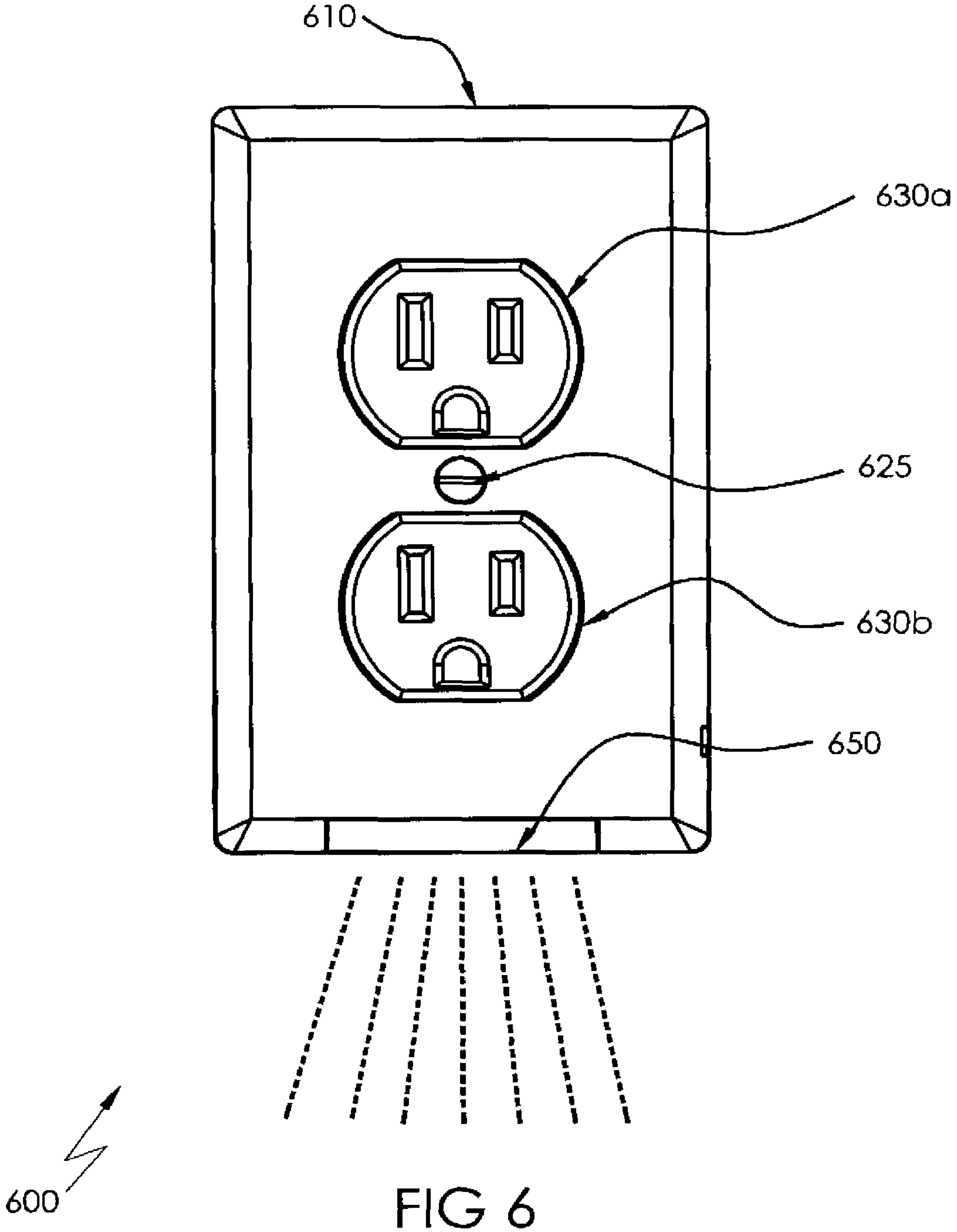
FIG. 6 is a front view of the illuminable wall socket plate attached to a wall socket, in accordance with an embodiment of the present invention.

FIG. 6 shows a front view of the illuminable wall socket plate 600 attached to a wall socket with a screw 625. In accordance with the embodiment described and shown the light 650 is continuously on when the illuminable wall socket plate 600 is attached to a wall socket. The light may be a dim light that requires a very small amount of electricity to maintain the light system. As such, the illuminable wall socket plate 600 provides safer lighting systems, allowing users to readily light hallways, bedrooms, bathrooms and the like, at a user's convenience without consideration to high additional electricity costs that may otherwise be incurred. In addition, the present invention maintains both socket receptacle 630*a* and 630*b* open for use, without blocking one receptacle to power the light 650 in the illuminable wall socket plate 600.

In yet another embodiment of the present invention, a method is disclosed for easily powering and installing an illuminable wall socket light comprising the following steps: providing metal tabs on the back of the wall socket plate for connecting to at least two wall socket screw terminals in a socket; connecting the metal tabs to the wall socket screw terminals by screwing the illuminable wall socket plate into a wall socket; obtaining electricity from the wall socket screw terminals through the metal tabs; converting the electricity from high alternating current power to low alternating current power for powering a light in the illuminable wall socket plate; and powering a light in the illuminable wall socket plate.

The method described in accordance with the present invention described in the above paragraph can further be used to power any number of devices suitable to be fitted onto a wall socket, including but not limited to, nightlights, fragrance plug-ins, motion sensors, optical sensors, sensors combined as a light switch, for safety signals in emergency systems, and for alarm systems.

In yet further embodiments of the present invention an on/off switch may be added to an illuminable wall socket plate in accordance with the present invention, for control and ease of use by a user. In accordance with this embodiment, an optical sensor switch may be used to power on and off a light, or a manual switch may be placed on the illuminable wall socket plate to adjust light settings.

The installation requirements of the illuminable wall socket plate in accordance with the present invention are very simple and easy to use for a consumer. Nonetheless the applicant suggests the following simple procedure:

a) Unscrewing an existing socket plate,
b) Aligning the metal tabs about the socket terminal screws, and c) Screwing the illuminable wall socket plate to the wall socket.

In accordance with the steps described, the direct contact the metal tabs with the socket terminal screws results in the electric current being transferred to a light in the illuminable wall socket plate as shown and described in FIG. 5. In yet other embodiments the electric current passing through the socket terminal screws may be conducted from other side tabs, metal plates or other variations of the embodiments described herein that would be obvious to one of ordinary skill in the art.

In addition, across the world there are many different types of sockets and socket plates available in the market. The embodiments of the present invention can be easily altered to accommodate any wall socket, including but not limited to type A, B, C, D, E, F, G, H, I, J, K, L, M electrical outlets, as each socket and receptacle varies in blade, pin, plug, power, and grounding mechanism, connecting and lighting an illuminable wall socket plate through power conducted through socket terminals is a unique finding in accordance with the present invention that can be easily implemented in any socket, socket box, or socket plate.

The applicant has given a non-limiting description of the devices, methods and system of the present invention. Many changes may be made to this design without deviating from the spirit of this invention. Examples of such contemplated variations include, but are not limited to the following:

a) The shape and size, thickness and material used for the illuminable wall socket plate or parts thereof may be modified.

b) The color, aesthetics and materials may be enhanced or varied, including a feature package of designs or stickers developed to decorate the illuminable wall socket plates described.

c) Additional complimentary and complementary functions and features may be added.

d) A more economical version and/or size of the illuminable wall socket plate may be adapted.

e) The illuminable wall socket plate may be operated manually with a switch or controlled or powered by a different energy, movement, light or other force.

f) The light and light durations may be varied.

Other changes such as aesthetics and substitution of newer materials remain within the spirit of the invention disclosed herein.

While this invention has been described with reference to illustrative embodiments, the embodiments are not intended to be construed in a limiting sense. Various modifications and combinations of the illustrative embodiments as well as other embodiments of the invention will be apparent to a person of ordinary skill in the art upon reference to this description. It is therefore contemplated that the appended claim(s) cover any such modifications and embodiments that fall within the true scope of the invention.

The invention claimed is:

1. A wall-plate system extending in longitudinal, lateral, and transverse directions that are orthogonal to one another, the wall-plate system comprising:

a wall plate comprising a front, a back, and at least one aperture, wherein the at least one aperture extends through the wall plate in the transverse direction and the back comprises at least one post extending rearward in the transverse direction;

a back plate abutting the back of the wall plate and comprising a front, a back, and at least one aperture extending in the transverse direction through the back plate; and electronic componentry comprising at least one aperture extending therethrough and at least one tab comprising an electronically conductive material connected to the wall plate and extending rearward away from the back of the wall plate in the transverse direction, wherein a post of the at least one post extends in the transverse direction first through the at least one aperture in the electronic componentry and then through the at least one aperture in the back plate to secure the back plate to the wall plate with the electronic componentry between the back of the wall plate and the front of the back plate.

2. The wall-plate system of claim 1, wherein the wall plate further comprises a rectangular outer perimeter forming lengthwise and widthwise extremes of the wall-plate system in the longitudinal and lateral directions, respectively.

3. The wall-plate system of claim 2, wherein the back plate is circumscribed by the rectangular outer perimeter of the wall plate.

4. The wall-plate system of claim 3, wherein:

the electronic componentry comprises a printed circuit board and at least one flat ribbon of metal extending to electrically connect the printed circuit board to the electrically conductive material of the at least one tab; and the electrically conductive material of the at least one tab is a monolithic extension of the at least one flat ribbon of metal.

5. The wall-plate system of claim 4, wherein:

the at least one tab comprises a first tab and a second tab; and the at least one flat ribbon of metal comprises a first flat ribbon of metal and a second flat ribbon of metal.

6. The wall-plate system of claim 5, wherein:

the first tab is positioned outboard of the at least one aperture of the wall plate; and the second tab is positioned outboard of the at least one aperture of the wall plate.

7. The wall-plate system of claim 6, wherein the first and second tabs are spaced from one another in the lateral direction and located on opposite sides of the at least one aperture of the wall plate.

8. The wall-plate system of claim 7, wherein:

the first flat ribbon of metal connects the first tab to the electronic componentry; and the second flat ribbon of metal connects the second tab to the electronic componentry.

9. The wall-plate system of claim 8, wherein;

the first tab is a monolithic extension of the first flat ribbon of metal; and the second tab is a monolithic extension of the second flat ribbon of metal.

10. The wall-plate system of claim 9, wherein the first and second flat ribbons of metal are both sandwiched between the front of the back plate and the back of the wall plate.

11. The wall-plate system of claim 1, wherein:

the electronic componentry comprises at least one flat ribbon of metal including a first aperture of the at least one aperture of the electronic componentry extending in the transverse direction therethrough; and the at least one flat ribbon of metal is sandwiched between the back of the wall plate and the front of the back plate.

12. The wall-plate system of claim 11, wherein a post of the at least one post extends in the transverse direction first through the first aperture in the at least one flat ribbon of metal and then through the at least one aperture in the back plate to secure the back plate to the wall plate with the at least one flat ribbon of metal therebetween.

13. The wall-plate system of claim 1, wherein the at least one aperture of the wall plate is shaped to admit a face of a duplex outlet therethrough.

14. The wall-plate system of claim 1, wherein the electronic componentry comprises a circuit board.

15. A wall-plate system extending in longitudinal, lateral, and transverse directions that are orthogonal to one another, the wall-plate system comprising:

a wall plate comprising a front, a back, and at least one fixture aperture extending therethrough in the transverse direction, wherein the back of the wall plate comprises at least one post extending rearward in the transverse direction;

the wall plate further comprising an edge and a light aperture, wherein the edge forms one extreme of the wall-plate system and the light aperture extends through the edge;

a back plate abutting the back of the wall plate and comprising a front, a back, and at least one aperture extending in the transverse direction through the back plate; and electronic componentry comprising a light source positioned proximate the light aperture, at least one aperture extending therethrough, and at least one tab comprising an electronically conductive material, the at least one tab connected to the wall plate and extending rearward away from the back of the wall plate in the transverse direction, wherein a post of the at least one post extends in the transverse direction first through the at least one aperture in the electronic componentry and then through the at least one aperture in the back plate to secure the back plate to the wall plate with the electronic componentry between the back of the wall plate and the front of the back plate.

16. The wall-plate system of claim 15, wherein the at least one fixture aperture is shaped to admit a face of a duplex outlet therethrough.

17. The wall-plate system of claim 15, wherein:

the electronic componentry comprises at least one flat ribbon of metal including a first aperture of the at least one aperture extending in the transverse direction therethrough; and the at least one flat ribbon of metal being sandwiched between the back of the wall plate and the front of the back plate.

18. The wall-plate system of claim 17, wherein a post of the at least one post extends in the transverse direction first through the first aperture in the at least one flat ribbon of metal and then through the at least one aperture in the back plate to secure the back plate to the wall plate with the at least one flat ribbon of metal therebetween.

19. The wall-plate system of claim 15, wherein the electronic componentry comprises a circuit board.

20. The wall-plate system of claim 19, wherein the light source is mounted on the circuit board.

* * * * *